Figure 1:
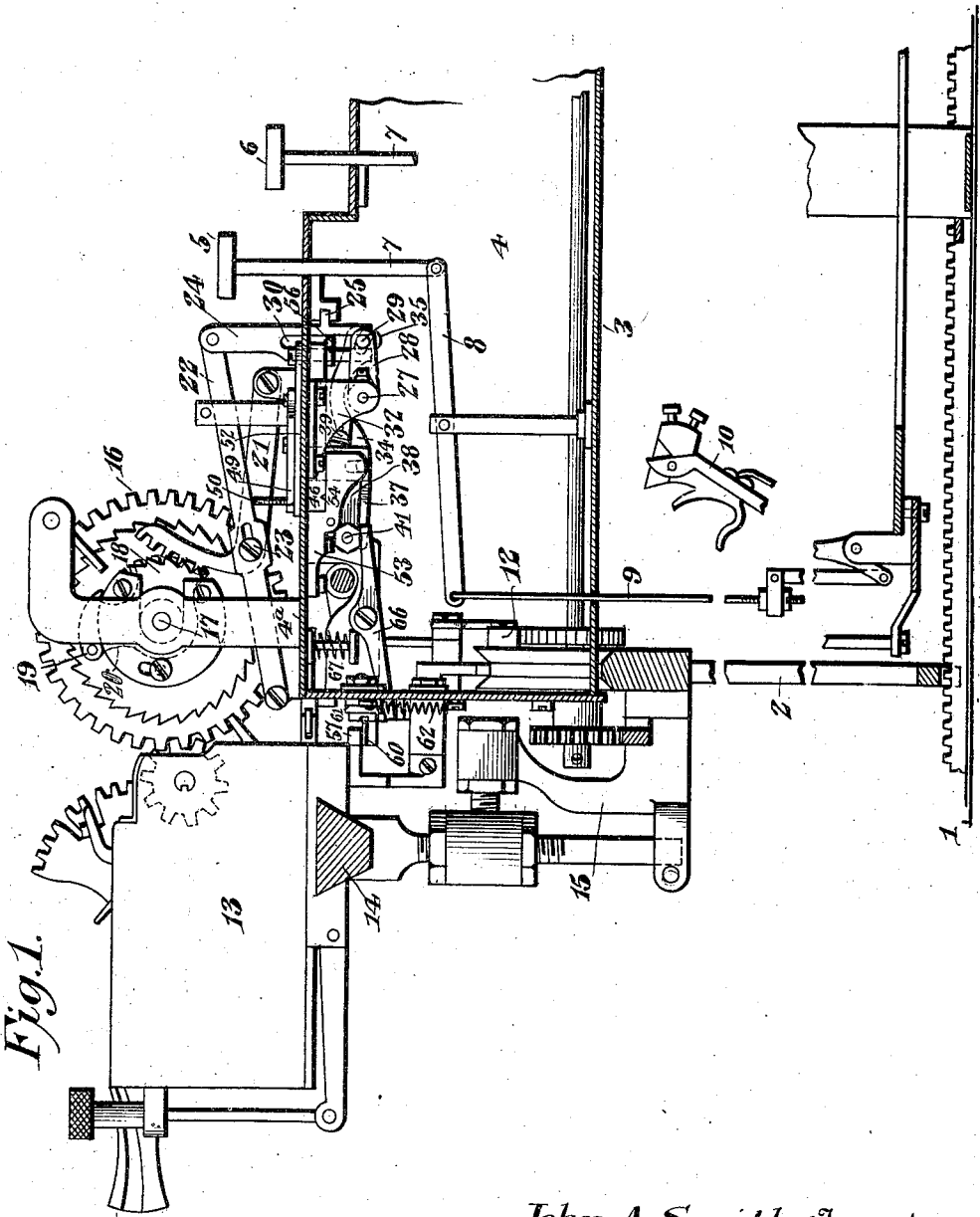

No. 863,232. PATENTED AUG. 13, 1907.
J. A. SMITH.
AUTOMATIC KEY CONNECTING MEANS FOR COMBINED TYPE WRITING
AND ADDING MACHINES.
APPLICATION FILED APR. 3, 1907.

5 SHEETS—SHEET 1.

Witnesses
Jas. K. McCathran
Louis G. Julihn

John A. Smith, Inventor
By C. G. Siggers
Attorney

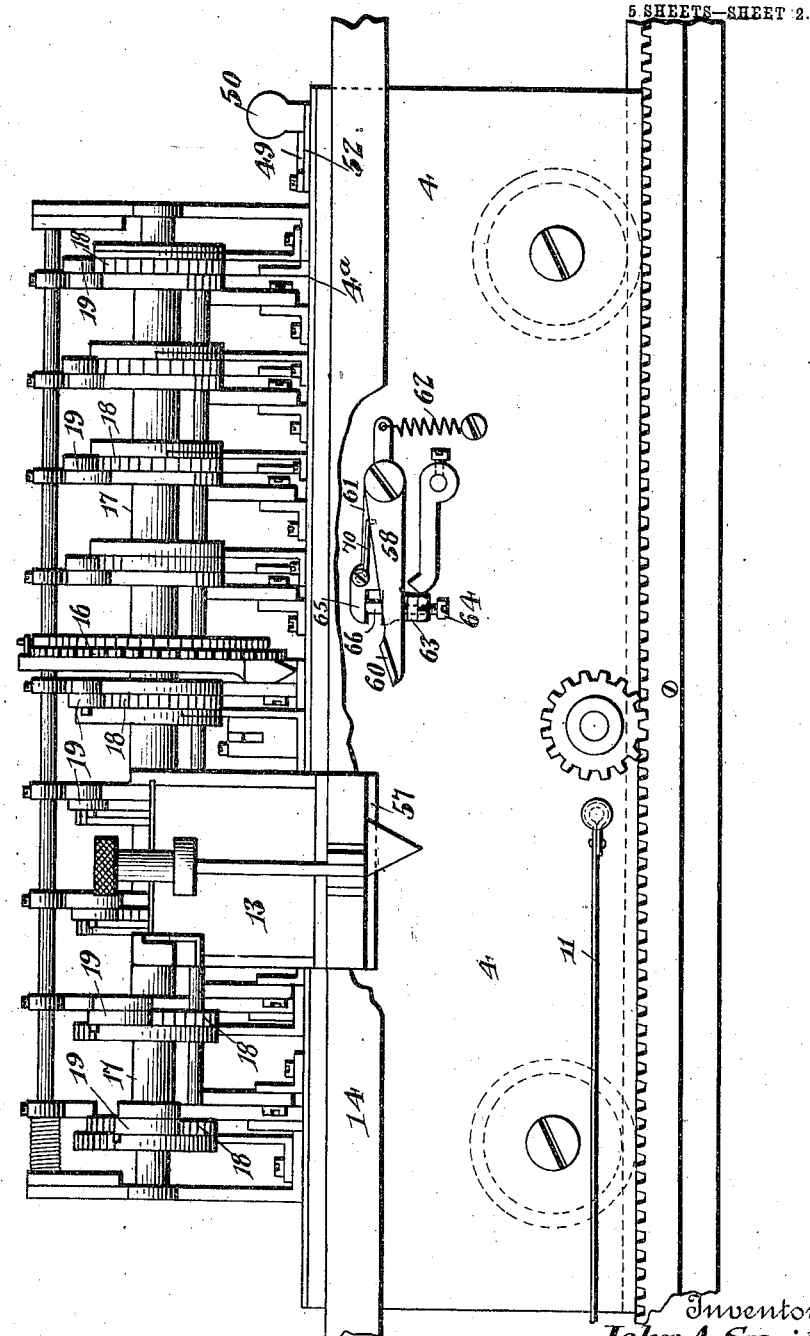

No. 863,232.

PATENTED AUG. 13, 1907.

J. A. SMITH.
AUTOMATIC KEY CONNECTING MEANS FOR COMBINED TYPE WRITING
AND ADDING MACHINES.
APPLICATION FILED APR. 3, 1907.

5 SHEETS—SHEET 3.

Witnesses
Jas. F. McCathran
Louis G. Julihn

John A. Smith, Inventor
By C. G. Biggers
Attorney

No. 863,232. PATENTED AUG. 13, 1907.
J. A. SMITH.
AUTOMATIC KEY CONNECTING MEANS FOR COMBINED TYPE WRITING AND ADDING MACHINES.
APPLICATION FILED APR. 3, 1907.
5 SHEETS—SHEET 4.
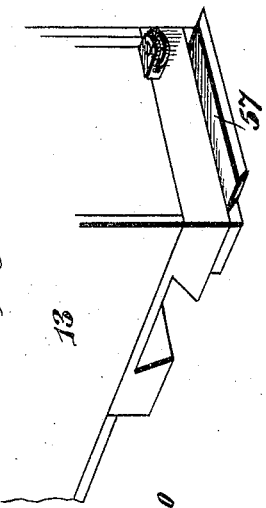
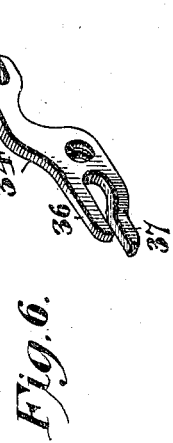
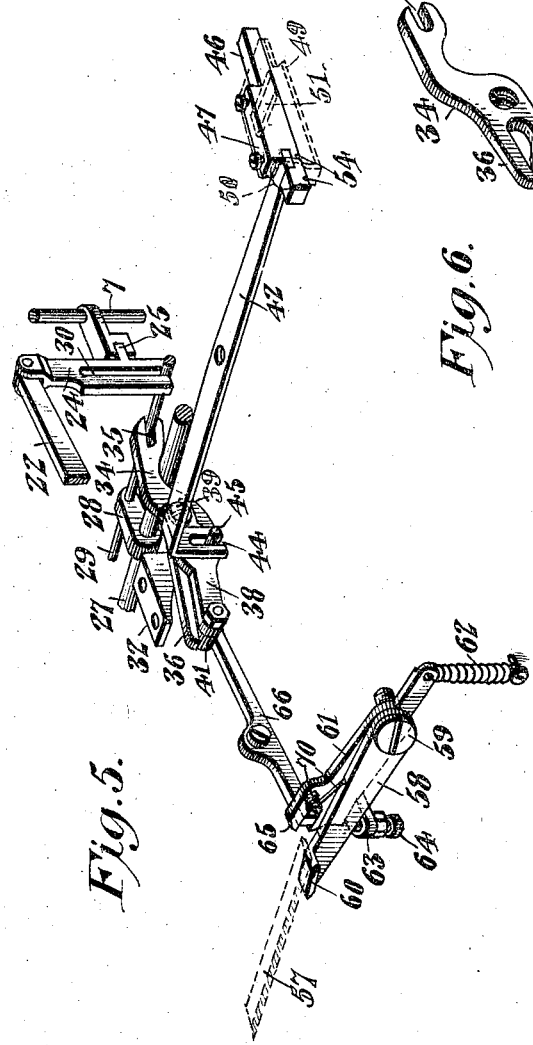
John A. Smith, Inventor
Witnesses
By
Attorney No. 863,232. PATENTED AUG. 13, 1907.
J. A. SMITH.
AUTOMATIC KEY CONNECTING MEANS FOR COMBINED TYPE WRITING AND ADDING MACHINES.
APPLICATION FILED APR. 3, 1907.
5 SHEETS—SHEET 5.
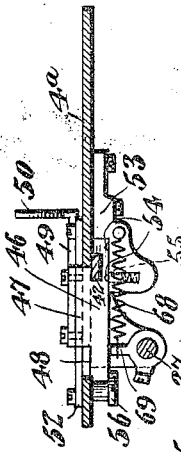
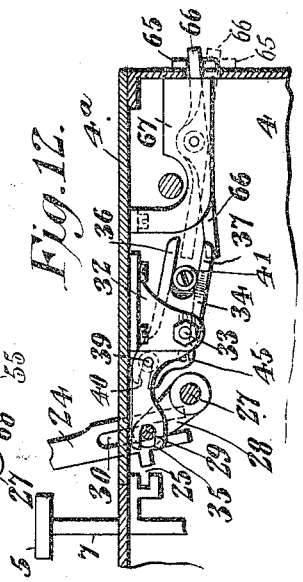
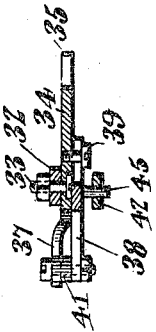
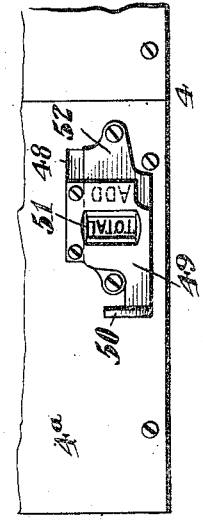
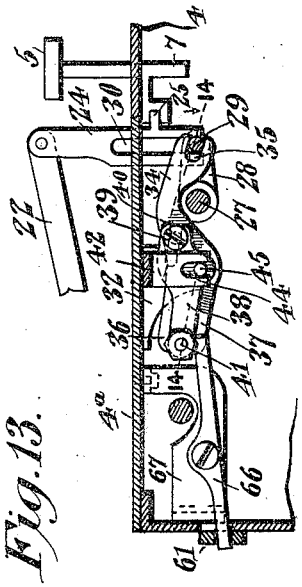
John A. Smith, Inventor
Witnesses
By
Attorney

UNITED STATES PATENT OFFICE.

JOHN ASBURY SMITH, OF HARRISBURG, PENNSYLVANIA, ASSIGNOR TO ELLIOTT-FISHER COMPANY, OF NEW YORK, N. Y., A CORPORATION OF DELAWARE.

AUTOMATIC KEY-CONNECTING MEANS FOR COMBINED TYPE-WRITING AND ADDING MACHINES.

No. 863,232.          Specification of Letters Patent.          Patented Aug. 13, 1907.

Application filed April 3, 1907. Serial No. 366,189.

*To all whom it may concern:*

Be it known that I, JOHN ASBURY SMITH, a citizen of the United States, residing at Harrisburg, in the county of Dauphin and State of Pennsylvania, have invented a new and useful Automatic Key-Connecting Means for Combined Type-Writing and Adding Machines, of which the following is a specification.

This invention relates to combined typewriting and adding machines, and more particularly to improved mechanism which will allow the unrestricted independent use of the typewriter, but which, when properly set, will cause the keys of the typewriter to be automatically connected to the adding mechanism for the actuation thereof when the printing point of the machine is presented opposite the adding field, and to be automatically disconnected when the movement of the carriage presents the printing point outside of said field.

Mechanism adapted to effect the automatic connection and disconnection of the keys in the manner stated has been heretofore devised, but such mechanism has been comparatively complicated in character and more or less difficult of instalment and repair.

Therefore, the primary object of the invention is to provide a mechanism of this character which will be extremely simple in construction, easy of instalment, adjustment and repair, and positive in action.

A further object of the invention is to associate with the automatic key connecting mechanism an indicator which, instead of indicating the connected or disconnected condition of the keys, will indicate whether or not the mechanism is set for automatic actuation, and consequently whether or not the keys will be automatically connected when the adding field is reached.

Subordinate objects will appear hereinafter, as the description of the illustrated structure proceeds.

Figure 4:
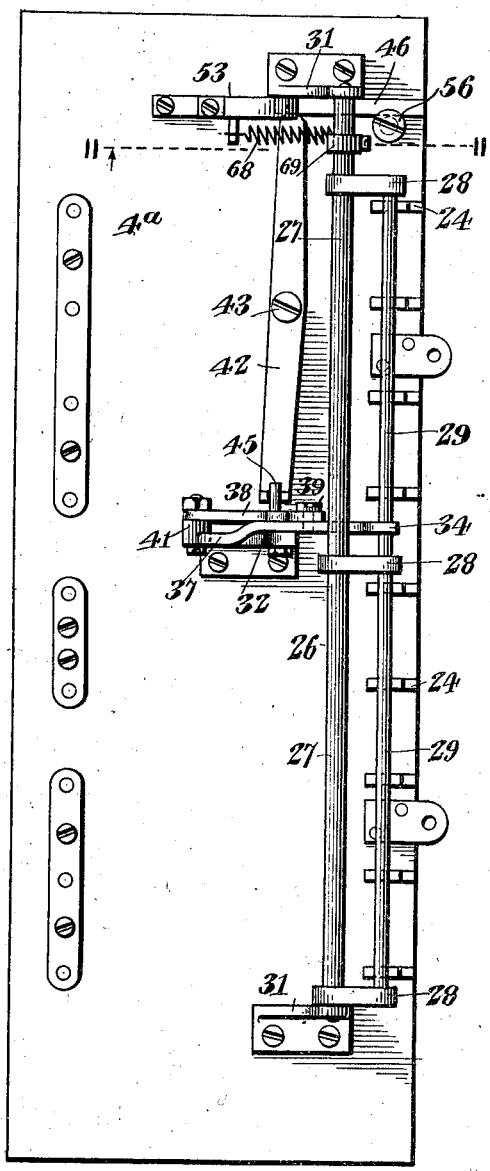
Figure 3:
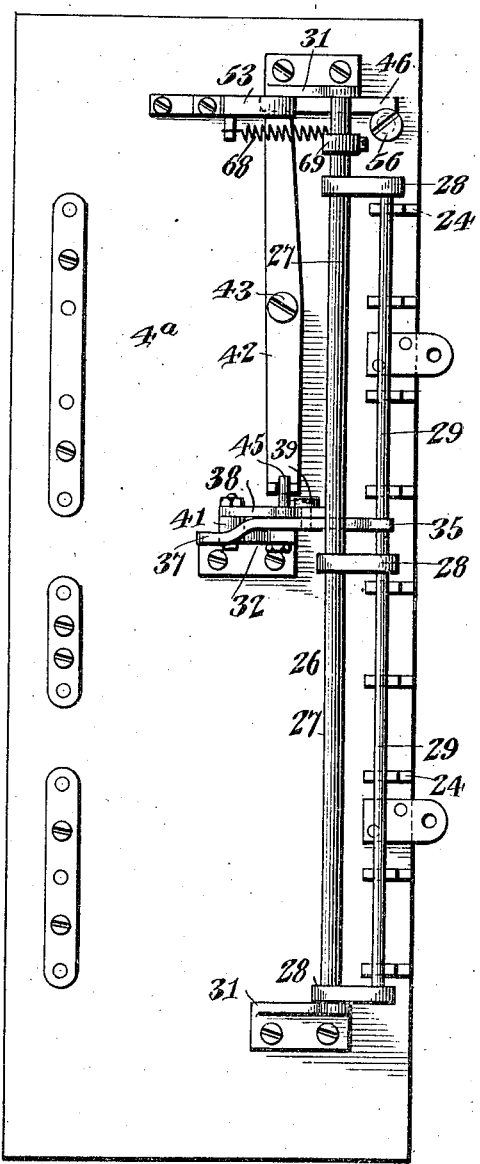

In the accompanying drawings—Figure 1 is a sectional elevation of an Elliott-Fisher billing machine equipped with automatic key connecting mechanism constructed in accordance with my invention. Fig. 2 is a rear elevation of the machine with parts broken away and other parts omitted. Fig. 3 is a bottom plan view of the cover-plate, showing the parts of the mechanism carried thereby in the normal or unset positions of the parts. Fig. 4 is a similar view, showing the parts in set position to cause the automatic connection of the keys and adding mechanism when the adding field is reached. Fig. 5 is a detail perspective view of the key connecting mechanism detached, the operating cam and the indicator being shown in dotted lines. Fig. 6 is a detail view of the yoke operating lever. Fig. 7 is a view of the lever mounted on the back of the carriage. Fig. 8 is a detail view of the abutment-plate. Fig. 9 is a perspective view of the bottom portion of the register or computing device, showing the position of the cam thereon. Fig. 10 is a plan view of the indicator. Fig. 11 is a section on the line 11—11 of Fig. 4. Fig. 12 is a sectional elevation, showing the positions assumed by the parts when the keys are disconnected, and the mechanism is unset, the operated position of the intermediate lever being indicated in dotted lines. Fig. 13 is a similar view observed from the opposite side and with the mechanism in set condition and the parts in the positions they assume when operated to cause the connection of the keys. Fig. 14 is a detail sectional view on the line 14—14 of Fig. 13, and Figs. 15 and 16 are detail perspective views of the parts 46 and 53.

Each part is indicated by the same reference character wherever shown.

*The billing machine.*—The machine to which my invention is shown applied is the Elliott-Fisher billing machine of commerce. This machine includes a flat platen 1 over which a machine frame 2 is mounted to travel longitudinally to space the lines of writing. Mounted to travel on the frame 2 transversely of the platen to letter space the writing is a carriage 3, the upper portion of which is in the form of a casing 4 surmounted by letter and numeral keys 5 and 6, the stems 7 of which are connected to key levers 8 fulcrumed in the casing and connected by draw-wires 9 to downwardly swinging type bars 10. The carriage is moved to the right by carriage propelling mechanism including spring drums, not shown, and tapes 11, a portion of one of the latter being shown in Fig. 2. The letter spacing movement of the carriage is controlled by key-operated escapement mechanism, indicated generally at 12 in Fig. 1. As usual in this class of machines, the characters are printed one at a time by the depression of the keys, and the carriage advances step-by-step under the control of the escapement as the keys rise.

*The computing mechanism.*—This mechanism includes a computing device or register 13 adjustable longitudinally of a guide bar 14 carried by brackets 15 secured to the frame 2. The adjustment of the register 13 enables the same to be located in position for use with reference to a column located at any desired point on the work sheet, which latter is supported in a flat spread-out condition on the platen 1.

The computing device or register usually embraces a series of denominational members or digit carriers disposed at the front of the register and equipped with suitable carrying mechanism whereby, when the value accumulated upon any member reaches the limit of that particular order or denomination, the value so accumulated will be automatically transferred to the wheel of next higher order. The primary element of the actuating mechanism for the denominational members of the register is a master wheel 16 mounted on the carriage 3 of the typewriter and movable therewith into engagement with successive denominational members of the register. The master wheel or actuator 16 is rotated a different distance by each numeral key 5 for the purpose of moving the engaged member a distance proportionate to the value of the particular numeral key from which the actuator is operated. Thus when any numeral key is depressed, the digit of corresponding value will be printed on the work sheet in a given denominational position, and the registering member of corresponding denomination will be given a movement corresponding in value to that of the printed digit, so that the value of such digit will be added to the amount already accumulated in the register. The master wheel 16 is fixed to a comparatively long actuator shaft 17 suitably supported above the carriage casing 4 and each numeral key 5 is arranged to be operatively connected with the shaft by one of a series of operating connections identical in construction and operation, except as to a graduated variation of the movement transmitted to the shaft from the several keys. One of these operating connections is shown in Fig. 1. It includes a ratchet wheel 18 fixed to the shaft 17 and designed to be engaged by a driving pawl 19 carried at one end of a driving arm or lever 20 mounted to swing loosely on the shaft 17. The opposite end of the lever 20 is geared to the rear end of a lever 21 fulcrumed at its front end on the carriage casing and arranged in crossing relation with a lever 22 fulcrumed at its rear end and having loose pivotal connection with the lever 21 at the point of intersection of said levers, as indicated at 23. From the front end of each lever 22 depends a link 24 connected to the adjacent numeral key stem 7 by a separable connection 25 located within the casing 4. In printing outside of a column or adding field, the actuator or wheel 16 is out of coincidence with the register 13, and therefore the latter is not operated when a digit is printed. If the connection between the links 24 and the numeral keys 5 were maintained, however, the keys when printing digits outside of an adding field would be burdened by the operating mechanism of the register, which mechanism would necessarily be operated upon each depression of a key. This unnecessary burdening of the numeral keys when printing outside of a column is undesirable, and furthermore, it is desirable under some circumstances to print digits in what would otherwise be the adding field without operating the register, as for instance, in printing sub-totals or a total. It is for this reason that the links 24 are arranged to be swung out of engagement with the numeral keys so as to render the latter entirely independent of the register or its operating connections.

For a more complete disclosure of the mechanism described than has been deemed necessary for the purposes of the present disclosure, attention is directed to Patent No. 829,971, issued to Laganke and Smith, September 4, 1906.

The shifting of the links 24 to effect the connection and disconnection of the keys and adding mechanism is accomplished by means of a yoke 26 comprising a shaft 27 having arms 28 connected by a rod 29 which rod is received within longitudinal slots 30 in the links 24, see Figs. 1 and 4. The shaft 27 is mounted to rock in brackets 31 secured to the under side of the cover-plate 4ª of the carriage 4. The yoke 26 is shown and described in the patent to Laganke and Smith, above identified, and in the patented construction is equipped with a total key located above the carriage and movable to shift the yoke for the purpose of swinging the links 24 into or out of engagement with the keys 5.

In carrying out my invention, the yoke 26 is utilized, but the total key for operating the same is eliminated, since there is no necessity for providing manually-operated means for causing the connection of the keys with the adding mechanism in addition to the automatic means which I provide for the accomplishment of this end.

*The means for automatically connecting the keys with the register operating mechanism when the printing point of the typewriter is presented to the adding field.* This mechanism is normally inoperative, but is adapted to be set in operative condition, and when so set, operates automatically to cause the keys and adding mechanism to be connected when the printing point of the machine moves into the adding field and to be automatically disconnected whenever the movement of the typewriter carriage presents the printing point outside of the adding field. Substantially midway of the cover-plate 4ª adjacent to the front side thereof depends a bracket 32 to one side of which is fulcrumed, as indicated at 33, a yoke operating lever 34, see particularly Figs. 6, 12 and 13. The front end 35 of the lever 34 is bifurcated, as shown in Fig. 6, to engage the rod 29 of the yoke 26, which yoke normally occupies the position shown in Fig. 12 with the links 24 swung back out of engagement with the key stems. That portion of the lever 34 lying in advance of its fulcrum is arched to avoid interference with the shaft 27 of the yoke when the lever is swung, and the rear end of the lever is bifurcated to form upper and lower arms 36 and 37, the latter being deflected laterally to the right, in order to present the arms in different vertical planes. On the left hand face of the lever 34 is mounted what may be termed an abutment plate 38 slidable longitudinally of the lever and guided in such movement by a headed stud 39 projecting from the lever at a point above and somewhat in advance of the fulcrum of the lever and engaging an open-ended slot 40 in the plate 38. At its rear end the abutment plate 38 is provided with an abutment having the form of a roller 41 extended laterally from the plate and disposed between the arms 36 and 37 of the lever 34, see Fig. 12.

It may be stated at this point that the abutment 41 normally occupies an inoperative position, to-wit, that shown in Fig. 12, but is adapted to be set in the operative position shown in Fig. 13 by means of setting mechanism which shifts the abutment plate 38 to move the abutment 41 back to the rear end of the lever 34 where the abutment may be engaged by operating mechanism which, through the medium of the abutment, swings the lever 35 to shift the links 24 into engagement with the key stems as will be more fully described.

The setting mechanism whereby the abutment plate 38 is shifted comprises a setting lever 42 fulcrumed intermediate of its ends, as indicated at 43, on the under side of the plate 4ª and having an angular slotted end 44 which engages a pin 45 extended laterally from the abutment plate 38 in substantially the horizontal plane of the fulcrum 33 of the lever 34, see Fig. 12. The opposite end of the setting lever 42 is connected to a slide 46 located adjacent to one end of the cover-plate 4ª at the under side thereof and having a projection 47 extended through a slot 48 in the plate 4ª and secured to one edge of an indicator plate 49 having a key or finger-piece 50 by means of which the slide 46 is shifted forward or back to swing the lever 42 and thus shift the fulcrum plate 38 into or out of its set or operative position. The indicator plate 49 is also provided with an opening 51 through which suitable subjacent indications are alternately visible, according as the abutment is set or unset. For instance, in Fig. 10 a second or bottom indicator plate 52 is provided with two indications, to-wit, the words "total" and "add", so located that in one position of the upper plate 49 the word "total" will be exhibited at the opening 51, while the word "add" will be obscured by the plate, whereas in the other position of the plate 59 the word "total" will be obscured and the word "add" exhibited. In the present instance, the exhibition of the word "total" indicates that the automatic key connecting mechanism is unset and that therefore the total may be printed in the adding field, since the keys will not be connected to the adding mechanism when the printing point of the machine moves into the adding field. On the other hand, if the indicator plate 49 is shifted to exhibit the word "add", such exhibition will indicate that the automatic mechanism has been set and that in consequence thereof the keys will be automatically connected with the adding mechanism to permit addition when the adding field is reached. The slide 46 is guided by a bracket 53 secured to the under side of the plate 4ª, as shown in Fig. 11, and in order to yieldingly retain the slide in either position to which it is moved, said slide is provided in its under side with depressions 54 which are presented alternately in engagement with a yielding detent 55 mounted in the bracket 53. A headed screw 56, also carried by the plate 4ª, assists in guiding the slide.

The mechanism operated by the movement of the carriage to swing the lever 34 and thus swing the yoke 26 to connect the keys and adding mechanism includes a cam-plate 57 extended across the front of the computing device casing, as shown in Fig. 9, and having its ends oppositely beveled. Arranged to co-act with the cam-plate 57 is an arm 58 swung from a stud 59 projecting from the back wall of the carriage casing, see Figs. 2 and 5. The arm 61 is provided at its free end with a laterally disposed lug 63 through which is screwed from the under side thereof a contact screw 64 the upper end of which supports the arm 58. The spring 62 retains the lever 61 and the arm 58 in such position that the lug 60 on said arm will engage the end of the plate 57 as the carriage advances and this causes the arm 58 to be depressed by said plate as the carriage continues to advance. This depression of the arm 58 will cause corresponding movement of the lever 61, the right hand end 65 of which is bifurcated to engage the rear end of what may be termed the intermediate lever 66 fulcrumed in a bracket 67 secured to the back wall of the casing 4. The front end of the intermediate lever 66 underlies the abutment 41 in the operative or set position of the latter. Therefore when the front end of the intermediate lever 66 is depressed by the cam-plate 57, through the medium of the arm 58 and the lever 61, the rear end of the lever 66 will be elevated. As the front end of the lever is engaged with the abutment 41, this movement of the lever 66 will swing the yoke-operating lever 34 from the position shown in Fig. 12 to that shown in Fig. 13, thus causing the yoke 26 to be swung forwardly to swing the links of the computing device operating connections into engagement with the stems of the numeral keys. The numeral keys 5 of the typewriter will then remain in operative connection with the adding mechanism as long as the printing point of the typewriter remains opposite the adding field. As soon as the printing point moves out of the adding field, the plate 60 of the lever 58 having reached the end of the cam-plate 57, will pass out from under the latter. The spring 62 will then immediately retract the levers 61 and 66 and the arm 58 to normal position and will permit the retraction of the yoke 26, the lever 34 and the links 24 to automatically disconnect the keys from the adding mechanism. This retraction of the yoke 26 may be effected in any suitable manner, but by preference, a yoke retracting spring 68 is connected at one end to an arm 69 on the shaft 27 and at its opposite end to a fixed part, as for instance, the bracket 53, see Figs. 3, 4 and 11. When the carriage is retracted, the lug 60 of the arm 58 will engage the end of the cam-plate 57, but instead of being depressed by the latter, will ride idly thereover against the resistance of a spring 70 carried by the lever 61 and bearing upon the arm 58 and serving to compel the arm to rise from the upper end of the screw 64 as soon as the lug 60 has been retracted beyond the plate 57.

Attention is now directed to the fact that in the normal unset or inoperative position of the abutment-plate 38, the lever 34 is not only inoperative by the lever 66, but is also locked against such accidental movement as might result in the accidental connection of the keys, and that when said plate is shifted to its operative or set position, the lever 34 is released or unlocked, so that it may be operated to swing the yoke and cause the connection of the keys and adding mechanism. It has been stated that the pin 45, which projects from the abutment-plate 38 and is engaged by the setting lever 42, is located in substantially the horizontal plane of the fulcrum 33 of the lever 34. It will be noted, however, by reference to Fig. 12, that normally the pin is located somewhat in advance of the fulcrum 33 and it therefore follows that to permit the operation of the lever 34, the pin 45 would have to move in an arcuate path, since as said pin is fixed to the abutment-plate, it is carried by and necessarily moves with the lever 34. Such arcuate movement of the pin 45 is prevented, however, by the engagement of said pin with the setting lever 42, and therefore said setting lever 42, by its coöperation with the pin 45, serves to lock the lever 34 against material accidental movement. When the abutment-plate 38 is shifted, however, from the position shown in Fig. 12 to that shown in Fig. 13, it not only sets the abutment 41 in position to be engaged by the lever 66, but also moves the pin 45 to a position substantially in line with the fulcrum 33 of the lever 34, so that, when the lever 34 is operated, the pin 45 merely rotates partially within the slot of the setting lever. As the setting lever opposes no resistance to this rotary movement of the pin, it follows that the pin will present no resistance to the operation of the lever 34.

In order that the language of the claims may be better understood, it may be observed that the links 24 constitute normally inoperative members of the key-operated actuating mechanism for the computing device; that the yoke 26 and the lever 34 constitute means for moving said member into operative position; that the levers 61, the arm 58, and the cam 59 constitute mechanism operated automatically or by the movement of the carriage, and that the movable abutment 41 constitutes a device capable of being set in either of two positions, in one of which the automatically operated mechanism is effective to operate the means for moving the normally inoperative member of the actuating mechanism into operative position, and in the other of which the automatically operated mechanism is ineffective for the performance of the stated function and the member is locked against accidental movement from its normal position.

Attention is also directed to the fact that in accordance with my present invention, as distinguished from those arrangements which have preceded it, the indicator indicates whether or not the keys will be automatically connected with the adding mechanism when the adding field is reached, instead of indicating whether or not the keys are in connected or disconnected condition. In other words, the indicator merely indicates whether the automatic key connecting mechanism is set for subsequent action or not, and the operator is thus advised whether the digit to be subsequently printed in the adding field will be accumulated in the register without further manual manipulation of the mechanism controlling the connection between the keys and the register.

It is thought that from the foregoing, the construction and operation of the described key connecting mechanism will be fully comprehended, but while the present embodiment of the invention is thought at this time to be preferable, I wish to be distinctly understood as reserving the right to effect such changes, modifications and variations of the illustrated structure as may come fairly within the scope of the protection prayed.

What I claim is:—

1. In a combined typewriting and calculating machine, the combination with a typewriter including a carriage, keys, and printing mechanism, of a computing device, means operated by the movement of the carriage to automatically cause an operative connection to be established between the computing device and keys, a device for setting said means for subsequent automatic actuation, and an indicator movable with said device to indicate the set or unset condition of the mechanism.

2. In a typewriting and calculating machine, the combination with a typewriter, including a carriage, keys, and printing mechanism, of a computing device, means operated by the movement of the carriage to cause an operative connection to be established between the computing device and keys, a device for setting said means for subsequent automatic actuation, and an indicator operated by the setting device and including a slotted plate and a plurality of indications alternately observable through the slot in said plate.

3. In a combined typewriting and calculating machine, the combination with a typewriter including a carriage, keys, and printing mechanism, of a computing device, means operated by the movement of the carriage to cause an operative connection to be established between the computing device and keys, said means including an abutment shiftable into and out of operative position, a setting device for the abutment, and an indicator including a slotted plate, movable with the setting device, and a plurality of indications observable through the slot in said plate to apprise the operator whether or not the keys and computing device will be automatically connected when the printing point of the typewriter is opposite the adding field.

4. In a combined typewriting and adding machine, the combination with a typewriter including a carriage, keys, and printing mechanism, of a computing device, operating connections between the computing device and the keys and including a member normally occupying an inoperative position, a yoke for moving said member, a yoke operating lever, and a shiftable abutment carried by the lever and operated by the movement of the carriage to operate the lever through the medium of the abutment in one position of the latter.

5. In a combined typewriting and calculating machine, the combination with a typewriter including a carriage, keys, and printing mechanism, of a computing device, operating connections between the computing device and the keys, said connections including a member normally occupying an inoperative position, a yoke arranged to move the member into operative position to connect the keys and computing device, a yoke operating lever, an abutment carried by the lever and shiftable longitudinally thereof, means for setting the abutment in operative or inoperative position, and mechanism operated by the movement of the typewriting carriage to move the yoke operating lever through the medium of the abutment.

6. In a combined typewriting and calculating machine, the combination with a typewriter including a carriage, keys, and printing mechanism, of a computing device, operating connections between the keys and the computing device, means controlling the connection between the keys and the computing device, said means including a series of levers, a cam mounted to cause the operation of said levers by the movement of the carriage, and a shiftable abutment carried by one lever and controlling the coöperative relation between said lever and an adjacent lever.

7. In a combined typewriting and calculating machine, the combination with a typewriter including a carriage, keys, and printing mechanism, of a computing device, operating connections between the keys and the computing device, said connections being normally inoperative, a lever movable to render the connections operative, an abutment-plate carried by said lever, an abutment carried by the plate, setting mechanism coöperating with the plate to normally lock the lever and operative to shift the abutment into operative position, and means operated by the movement of the typewriter carriage to swing the lever when the abutment is in operative position.

8. In a combined typewriting and calculating machine, the combination with a typewriter including a carriage, keys, and printing mechanism, of a computing device, normally inoperative connections between the keys and the computing device, a lever movable to render the connections operative, an abutment plate shiftable on the lever and carrying an abutment, a setting lever connected to the plate to shift the same to present the abutment in or out of operative position, the connection between the setting lever and the plate being movable into or out of line with the fulcrum of the lever, whereby the lever is normally locked, but is unlocked when the abutment is shifted into operative position, and means operated by the movement of the typewriter carriage to shift the lever through the medium of the abutment when the latter occupies its operative position.

9. In a combined typewriting and calculating machine, the combination with a typewriter including a carriage, keys, and printing mechanism, of a computing device, normally inoperative connections between the keys and the computing device, a lever movable to render the connections operative, an abutment plate shiftably mounted on the lever and provided with an abutment and with a pin, said pin being shiftable into and out of line with the fulcrum of the lever, a setting lever engaging the pins and cooperating therewith to lock the lever when the pin is disposed out of line with the fulcrum thereof, and means operated by the movement of the carriage to swing the lever through the medium of the abutment.

10. In a combined typewriting and calculating machine, the combination with a typewriter including a carriage, keys, and printing mechanism, of a computing device, normally inoperative connections between the keys and the computing device, a lever movable to render the connections operative, a shiftable abutment carried by said lever, a cam-operated lever, and a lever intermediate of the cam-operated lever and the lever first named and disposed to engage the abutment in one position of the latter.

11. In a combined typewriting and calculating machine, the combination with a typewriter including a carriage, keys, and printing mechanism, of a computing device, normally inoperative connections between the keys and the computing device, a lever movable to render the connections operative, a shiftable abutment carried by the lever, a setting lever for the abutment, a slide movable with the setting lever, an indicator, operated by the slide, and means operated by the movement of the carriage to swing the lever through the medium of the abutment.

12. In a combined typewriting and calculating machine, the combination with a typewriter including a carriage, keys, and printing mechanism, of a computing device, operating connections between the keys and the computing device, said connections including a series of links movable into and out of engagement with the keys, a yoke arranged to move said links into engagement with the keys, a lever movable to swing the yoke, a plate shiftably carried by the lever and provided with an abutment, a pin extended from the plate, a setting lever engaging the pin and arranged to move the same into or out of line with the fulcrum of the lever and coöperating with the pin to lock the lever when the pin is out of line with the fulcrum of the latter, an indicator operated by the setting lever, and means operated by the movement of the carriage to swing the lever through the medium of the abutment in one position of the latter.

13. In a combined typewriting and calculating machine, the combination with a typewriter including a carriage, keys, and printing mechanism, of a computing device, means operated by the movement of the carriage to automatically cause an operative connection to be established between the computing device and keys, a device for setting said means for subsequent automatic actuation, and an indicator for said setting device.

In testimony, that I claim the foregoing as my own, I have hereto affixed my signature in the presence of two witnesses.

JOHN ASBURY SMITH.

Witnesses:
   CHAS. T. SUGAUH,
   HERBERT D. BOLTON.